C. S. LOMAX.
PROCESS AND APPARATUS FOR RECOVERY OF BY-PRODUCTS FROM DISTILLATE GASES.
APPLICATION FILED DEC. 22, 1919.
1,408,105.
Patented Feb. 28, 1922.
2 SHEETS—SHEET 2.
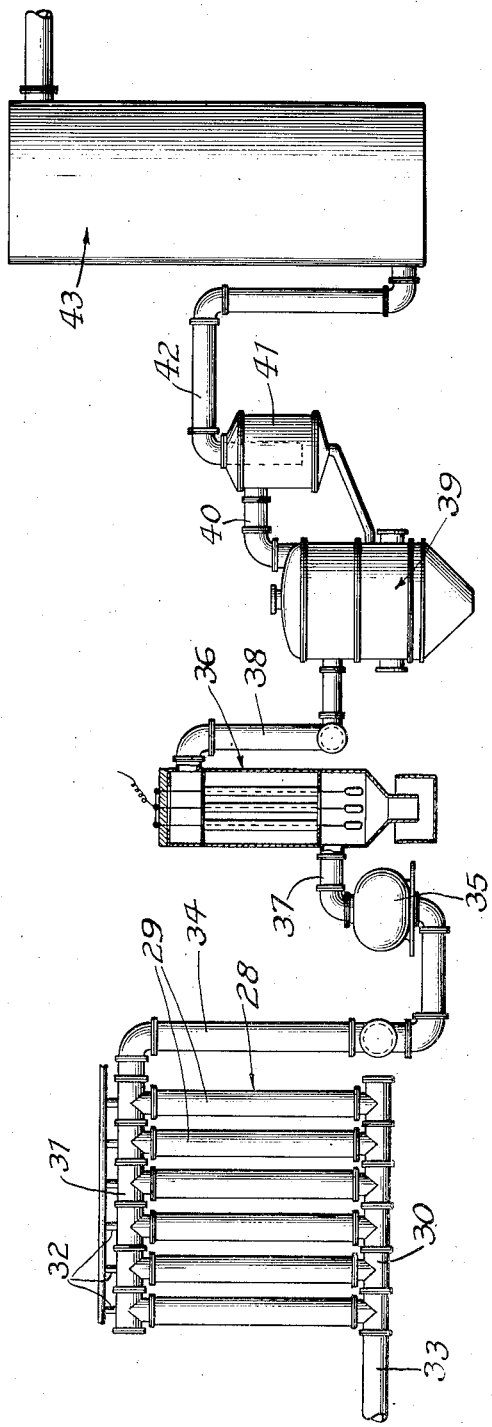

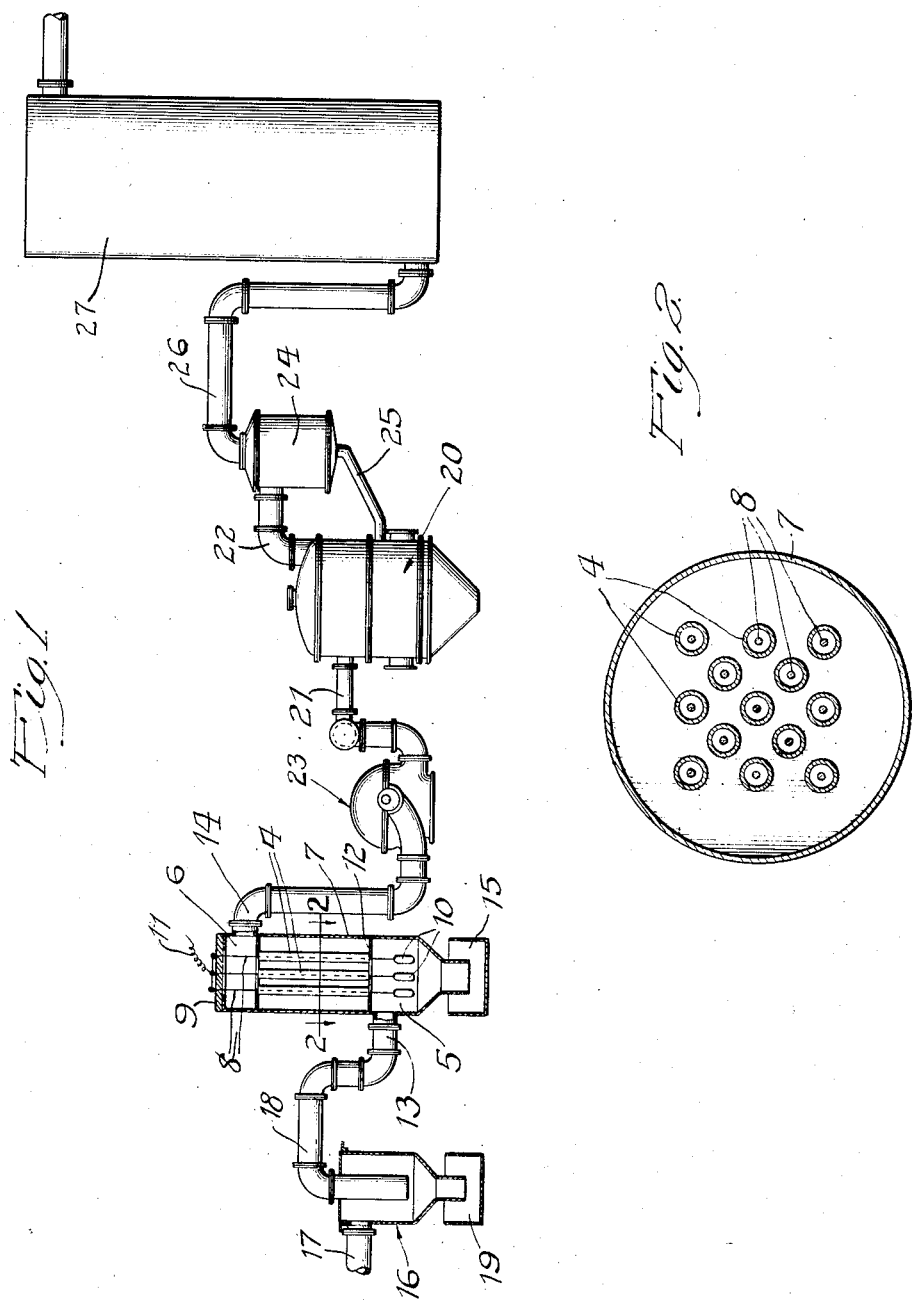

UNITED STATES PATENT OFFICE.

CLARENCE S. LOMAX, OF CHICAGO, ILLINOIS, ASSIGNOR TO AMERICAN COKE & CHEMICAL COMPANY, OF CHICAGO, ILLINOIS, A CORPORATION OF MAINE.

PROCESS AND APPARATUS FOR RECOVERY OF BY-PRODUCTS FROM DISTILLATE GASES.

1,408,105.     Specification of Letters Patent.     Patented Feb. 28, 1922.

Application filed December 22, 1919. Serial No. 346,622.

*To all whom it may concern:*

Be it known that I, CLARENCE S. LOMAX, a citizen of the United States, residing at Chicago, in the county of Cook and State of Illinois, have invented certain new and useful Improvements in Processes and Apparatus for Recovery of By-Products from Distillate Gases, of which the following is a specification.

The present invention has to do with certain improvements in processes for recovering by-products from distillate gases of a complex nature such as are evolved during the distillation of coal-like material, as, for example, in the manufacture of coke. Gases of this general nature are more or less complex in their composition and properties, and certain of their constituents may be separated by precipitation, leaving the fixed gases and certain other constituents for subsequent treatment or use.

The constituents which may be so separated include the tarry materials, and oils of various grades, which are generally classed as heavy, medium, and light oils. Certain other constituents, such as ammonia, may be removed by chemical reaction, as, for example, with sulphuric acid, with the formation of ammonium sulphate. Various of these constituents may be precipitated by lowering the temperature of the complex gas to a point below the dew point of each such constituent, whereupon such constituent will condense and be precipitated if present in sufficient proportion and relationship to the other constituents. It is thus theoretically possible to recover different constituents having different dew points by cooling the gases to the proper temperatures. It is found, however, in practice, that this operation results in many cases in the precipitation of other constituents than those particularly desired, so that, for example, there is generally found, mixed with the heavier oils or tars, a greater or less percentage of liquors containing ammonia compounds. When, therefore, the gases after such treatment are taken over to the ammonia apparatus they do not contain their full quantity of ammonia compounds, and therefore the tars and heavy oils must be separately treated if the full quantity of ammonia is to be recovered.

Furthermore, it is often desired to recover the light oils, such as benzol, by an operation or process subsequent to the separation of the ammonia compounds, since these light oils possess properties very different in many respects from the heavy oils, notably in the matter of the boiling point. When the precipitation of the tars and heavy oils is effected by condensation through temperature reduction, it almost invariably happens that a greater or less percentage of light oils will be entrapped with the dew drops as they are formed and carried down into the tar and heavy oils precipitated, so that said precipitate will contain a greater or less percentage of the light oils. These light oils are generally valuable either in themselves or as bases for the manufacture of other products, and therefore any loss of light oils in this manner is to be avoided as much as possible.

The main object of the present invention is to provide a process and apparatus by means of which the tars and heavy oils may be completely precipitated without the necessity of making use of temperature reduction and without the absorption or entrapping of any of the light oils from the gas, or the precipitation of any liquor containing the ammonia compounds. This will make it possible to secure a very much cleaner gas for a subsequent treatment, since the tarry matters and heavy oils have been completely eliminated; will make it possible to subsequently recover the full quantity of light oils; and will make it unnecessary to resort to special treatment of the tars and heavy oils for the recovery of entrapped ammonia, as by way of distillation.

I have discovered the fact that if the complex gas containing the tarry or heavy oil constituents be subjected to the influence of a high potential electric current, either direct or alternating, so that a strong static effect is produced on such gas, the tar and heavy oil constituents will be precipitated in the form of a dew or heavy vapor which will fall to the lower portion of the apparatus within which the process is carried forward; and that this precipitation will be effected in a very clean and thorough manner without the entrapment of the ammonia and light oil constituents. I have also discovered the fact that by the use of proper apparatus it is possible to carry forward the precipitation of the heavy oil and tarry constituents electrically in a continuous manner, subjecting a constantly flowing stream of gas to the static influence of the electric current, the materials in such case being precipitated on vertical or slanting walls over the surfaces of which they may readily flow to suitable receptacles within which they may be collected. I have also discovered that by the use of such electric current on the stream or current of gas it is possible to effect the aforesaid complete removal of tarry matter and purification of the gas at temperatures in the neighborhood of 100° C., the boiling point of water at atmospheric pressure, so that by the use of the said process it is possible to effect the complete removal of the tarry matters without precipitation of the light oils, and the gas may be sent directly to the ammonia saturater after such precipitation of tarry matters, without the necessity of reheating in order to avoid precipitation of water in the acid of the ammonia saturater.

In some cases it may be desirable to bring about the precipitation of the tarry matters and the heavy oils by lowering the temperature, but ordinarily when this method or process is used there remains a larger or smaller percentage of tarry matter suspended in the gas and unprecipitated simply by the temperature lowering. Even in the case of such a process the use of a static high potential electrical influence on the gas will be of benefit, since it will serve to remove the last traces of tarry matter and heavy oils from the gas and insure the delivery of the gas to the ammonia saturater or other apparatus, if such be used, in the cleanest condition possible. In the case of such an arrangement and method of operation the electrical influence apparatus may be placed between the condenser and the ammonia saturater so as to act upon the gas between the time it leaves the condenser and the time at which it enters the ammonia saturater.

In the drawings:

Figure 1 shows diagrammatically a series of devices or apparatus for carrying out the method of the present invention, the arrangement illustrated in this figure being such that the tarry matters and heavy oils may be initially removed without cooling by means of a so-called "cyclone" precipitator or the like;

Fig. 2 shows a cross section taken on line 2—2 of Fig. 1, looking in the direction of the arrows, Fig. 2 being on greatly enlarged scale as compared with Fig. 1; and Fig. 3 shows diagrammatically another group of devices or apparatus, also for practicing the method to which the present invention relates.

I will state in the first place that any suitable apparatus or arrangement may be used for subjecting the stream or current of gas to the influence of a high potential current, but ordinarily such an arrangement will involve the presence of two or more electrified surfaces, generally of opposite polarity, between which the stream of gas passes. A simple arrangement of such apparatus would be one in which the gas would be passed through one or more tubes or flues, said tubes or flues being connected to one side of the electric circuit, and there being provided within the tube or flues one or more oppositely charged conductors. Such an arrangement is illustrated in the several figures. It includes a series of tubes or flues 4 extended in vertical fashion between lower and upper manifolds or chambers 5 and 6 respectively. Said tubes or flues receive the gas from the manifold or chamber 5 and conduct it to the manifold or chamber 6. If desired, a common inclosure 7 may be provided to give a finish to the apparatus.

A series of wires or rods 8 extend longitudinally through the tubes or flues 4 without contact therewith, and a simple arrangement for accomplishing this result is to place the tubes or flues in vertical fashion, suspending the rods or wires through them from an insulating block or the like 9. Weights or the like 10 may be placed on the lower ends of the rods or wires to maintain them taut and in proper position. The rods or wires are connected to a common terminal 11, which is electrified of one polarity, and the tubes or flues may be electrically connected to a head sheet 12 which may be electrified of the opposite polarity.

The gas enters the lower manifold or chamber 5 through a connection 13, and after passing up through the tubes or flues is discharged from the upper manifold or chamber 6 by means of a connection 14. The tarry matters and oils precipitated by action of the electric current will collect on the surfaces of the tubes or flues and the rods or wires 8, and will run down over said surfaces into the chamber 5, where they may be collected within a tar pot 15 of any suitable construction. This tar pot is preferably so arranged as to also constitute a gas seal.

When the electrical precipitation of the tarry matters is to be used in conjunction with a "cyclone" precipitator or the like, the same will be placed in advance of the electrical precipitator. The "cyclone" precipitator is designated by the numeral 16 and is of any suitable and familiar type of construction. The gas enters it by a connection 17 and is delivered from it through a connection 18 which leads to the inlet connection 13 of the electrical precipitator. A tar pot 19 serves to collect the tar mechanically ejected in the "cyclone" precipitator. When using this arrangement the gas will ordinarily enter the "cyclone" precipitator at a temperature of 80° to 100° C., and will be delivered to the electrical precipitator at a temperature practically the same as above.

The ammonia saturater is designated in its entirety by the numeral 20. It may be of any suitable construction. The gas enters the saturater through the connection 21 and is discharged therefrom through the connection 22. Ordinarily a centrifugal exhauster 23 will be placed between the discharge connection from the electrical precipitator and the inlet connection 21 of the ammonia saturator. This exhauster will in such case serve to raise the temperature of the gas slightly before it enters the saturater, owing to the slight compression of the gas which will be effected. A centrifugal acid separator 24 may be placed in position to receive the gas from the ammonia saturater, and the small amount of acid carried over from the saturator will be returned to the saturator by means of a connection 25. The gas will leave the centrifugal acid separator through the connection 26, and will then pass on to a cooler 27 or any other suitable piece of apparatus.

Referring now to the arrangement shown in Fig. 3, the same differs from that just explained mainly in the fact that a reciprocating cooler or condenser 28 is used for bringing about the initial precipitation or elimination of the tarry matters and heavy oils. This condenser may be of any suitable construction, but a very satisfactory construction is that illustrated, in which there are provided one or more vertical flues 29 extending between a gas inlet manifold 30 at the bottom and a gas delivery manifold 31 at the top. Suitable connections 32 are provided for the delivery of sprays of cooling liquid into the upper portions of the flues or passages 29 and into the gas flowing upwardly therethrough, so as to lower the temperature of the gas to the dew point of the constituent or constituents sought to be removed. The gas will enter the lower manifold 30 through an inlet connection 33 and will be delivered from the upper manifold 31 through a delivery connection 34. Ordinarily the gas entering at the connection 33 will have a temperature of approximately 95° to 100° C., as it comes from the hydraulic main, and the gas delivered through the connection 34 will ordinarily have a temperature of about 25° C. A positive exhauster 35 may be provided to take the gas from the connection 34 and deliver it to the electrical precipitator 36 through a connection 37. There will ordinarily be a slight increase of temperature occasioned by the compression of the exhauster 35, so that the temperature of the gas entering the electrical precipitator may be in the neighborhood of 28° C.

The gas coming from the electrical precipitator passes by way of a connection 38 to an ammonia saturater 39 which may be of any suitable construction, thence by a connection 40 to an acid separator 41, and thence by a connection 42 to a cooler 43, or any other desired piece of apparatus.

Ordinarily the gas leaving the electrical precipitator will be at a temperature approximately the same as that at which it entered said precipitator, in which case the gas entering the ammonia separater will have a temperature of 25° to 30° C. The voltage to which the gas should be subjected in the electrical precipitator will, of course, depend in each case upon the construction of the precipitator, the gap between the oppositely electrified surfaces largely influencing the voltage which should be used. Ordinarily, however, if the flues or tubes 4 have a diameter of approximately six inches, a voltage of 20,000 to 25,000 will be found satisfactory.

It will be observed that in both of the arrangements herein illustrated the gas passes in a practically direct manner from the electrical precipitator to the ammonia saturater, and to all intents and purpose without preheating before entering the ammonia saturater; and it will be also observed that if desired the major portion or bulk of the tarry matter and heavy oils may be removed in the first instance before the gas reaches the electrical precipitator.

I claim:

1. In a by-product recovery apparatus, the combination of means for removing tarry materials and the like from gases of carbonization delivered by a collecting main without reduction of temperature after leaving the said main, an ammonia saturater, and electrical precipitation means interposed between said tar removing means and the ammonia saturater, and comprising a flue or passage for the transfer of the gas without temperature reduction in its travel between the tar removing means and the ammonia saturater, and means for subjecting the gas during such transfer in such passage to the influence of a high potential electrical current, substantially as described.

2. In a by-product recovery apparatus, the combination of means for mechanically removing tarry matter and the like from the gas delivered by a collecting main without temperature reduction after leaving the said main, an ammonia saturater, and an electrical precipitator and an exhauster interposed between the tar removing means and the ammonia saturater, said electrical precipitator comprising a passage for the transfer of gas in its travel without temperature reduction, and means for subjecting the gas during such transfer to a high potential electrical current, substantially as described.

3. The process for the treatment of gases of carbonization for the recovery of tarry constituents and the like and ammonia therefrom, which consists in subjecting a current of said gas as it comes directly from the hydraulic main, first to the influence of a mechanical tar extracter for the removal of tar and heavy oils without temperature reduction, immediately thereafter passing the gas through a passage without temperature reduction, and within which passage it is subjected to the influence of a high potential electrical current for the precipitation of the last traces of suspended tarry materials and the like, thereafter passing the gas through an exhauster and directly to an ammonia saturater without temperature reduction, whereby the entire quantity of tar and heavy oils is removed and the gas purified without temperature reduction prior to the delivery of the gas to the ammonia saturater, substantially as described

CLARENCE S. LOMAX.